(12) United States Patent
Cheng

(10) Patent No.: US 7,129,699 B1
(45) Date of Patent: Oct. 31, 2006

(54) PHASE DETECTOR FOR ROTATING EQUIPMENT

(75) Inventor: James Cheng, Langley (CA)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 11/237,011

(22) Filed: Sep. 28, 2005

(51) Int. Cl.
G01B 7/30 (2006.01)

(52) U.S. Cl. ............... 324/207.15; 324/207.25; 324/260

(58) Field of Classification Search ............... 324/207.15–207.17, 207.25, 207.26; 340/686.1; 318/653; 702/145, 150–153
See application file for complete search history.

(56) References Cited

U.S. PATENT DOCUMENTS 5,754,042 A * 5/1998 Schroeder et al. ..... 324/207.25
6,271,661 B1 * 8/2001 Andermo et al. ...... 324/207.17
6,448,760 B1 * 9/2002 Neumann et al. ........ 324/207.2
6,977,594 B1 * 12/2005 Hudman et al. ......... 340/686.1

* cited by examiner

Primary Examiner—Jay M. Patidar
(74) Attorney, Agent, or Firm—Christensen O'Connor Johnson Kindness

(57) ABSTRACT

A very accurate rotational phase detection system is disclosed having first and second disks that are encoded with a 31-digit pseudo-random M-sequence, the first and second disks being attached to rotationally-coupled members. In the disclosed embodiment, the encoding is accomplished by dividing the disks into 31 sections and contouring the periphery of the disks such that sections corresponding to "1" have a larger radius and sections corresponding to "0" have a smaller radius. Sensors—for example, inductive proximity sensors—are positioned near the periphery of the first and second disks that detect the encoded pseudo-random sequences and are periodically sampled (for example, at 50 kHz) to generate first and second detected sequences. The first and second detected sequences are processed to remove noise and to range between +1 and −1, and are then cross-correlated to determine the rotational phase relationship between the attached rotating members.

21 Claims, 13 Drawing Sheets

PHASE DETECTOR FOR ROTATING EQUIPMENT

FIELD OF THE INVENTION

The present invention relates to phase detectors for rotating mechanical components and, in particular, to very accurate detection of the rotational phase relationship between rotating members.

BACKGROUND OF THE INVENTION

Modern industrial machinery such as manufacturing and processing equipment frequently relies upon very precise coordination and/or control of various aspects of the machinery in order to achieve a desired functionality. However, such machinery must be constructed within certain manufacturing tolerances that limit the achievable precision between the cooperative actions of various components of a complex machine. Also, normal wear and tear on a machine can cause variations from design parameters that can affect the precision of relationships and interactions between different machine components. Another source of uncertainty is the dynamic response of components to loads experienced during operation. Failure to achieve a desired level of coordination between various components can have serious consequences ranging from a loss of quality in the final product to catastrophic failure of the machinery.

In some instances, computerized detection and control systems are employed to achieve and/or maintain a desired level of precision of relative action between different components of an apparatus. The effectiveness of such systems is limited, however, by a number of factors including the ability of the detection systems to accurately and rapidly detect and compare the status or functioning of the relevant components during operation of the machine, thereby precluding the user from determining if the desired accuracy in the operational parameters is achieved.

Often the desired functionality of a machine is achieved by the cooperative actions of related components that include and/or are controlled by co-rotating shafts or other rotating components. For example, rotating shafts may directly drive particular related components or the shaft may include cranks, cams, or eccentric portions that act on other components through connecting hardware. When different co-rotating shafts are driving different cooperating machine components, the co-rotating shafts typically must maintain a particular rotationally-phased relationship with each other. The accuracy of the phased relationship can be critical to proper operation of the overall machine.

It will be appreciated that in large mechanical systems, particularly in applications involving large and/or rapidly changing loads, achieving a high degree of precision in the phase relationship between rotating shafts can be a challenge. While the design of machinery to produce a desired phase relation between components is typically straightforward for the ideal machine, in the real machine the phase relation between components may vary due to a number of factors including, for example, (i) manufacturing tolerances and, in particular, the accumulation of such tolerances; (ii) elasticity in the components under the applied loads, including temperature-related changes in such properties; (iii) changes in dimension and material properties due to temperature variations; and (iv) wear and tear in the equipment over time. Accurately determining the rotational phase between components may be important for machine design, proper set-up, control, and/or detection of problems.

There is a need, therefore, for systems and methods for determining the phase relation between rotating components in mechanical systems.

SUMMARY OF THE INVENTION

A system and method for very precisely determining the rotational phase difference between two rotatably coupled shafts or other rotating members are disclosed. The system includes disks attached and rotatable with the rotating members. Each of the disks has a pseudo-random binary sequence encoded on its periphery. A sensor is provided at or near the periphery of each disk to detect the encoded sequence while the shafts are rotating. Each sensor is sampled periodically to generate a detected sequence for each disk. The detected sequences may be filtered to remove noise and normalized to facilitate subsequent processing. The resulting sequences are cross-correlated, which produces a spike or peak in the cross-correlation indicating the phase relationship between the two rotating members and similar peaks spaced apart by the period of rotation. To improve the accuracy of the phase detection, a linear fit extrapolation of the peaks, as described herein, may be used to more precisely locate the phase or time phase relationship between the two rotating members.

In a disclosed embodiment, the disks are encoded with a 31-digit pseudo-random M-sequence by forming the disks from a steel or other ferrous material and dividing the disk into 31 circumferential segments to correspond to the 31-digit M-sequence. Other pseudo-random sequences could alternatively be used, including other M-sequences. The disk is shaped such that segments corresponding to "0" in the M-sequence have a shorter radius than segments corresponding to "1" in the M-sequence. A proximity sensor is provided near the periphery of the disk and detects when longer radius segments are approximately adjacent the sensor. The sampling rate in a particular embodiment is about 50 kHz and produces a detected sequence during rotation that is related to the encoded M-sequence. The detected sequence may be filtered to eliminate noise and is normalized to range between +1 and −1 for ease of subsequent calculations. The normalized sequence from one disk is cross-correlated with the normalized sequence from the second disk to determine the phase time difference between the rotational positions of the corresponding rotating members. The time difference can be divided by the period of rotation to determine the rotational phase of the two rotating members.

A particular embodiment of a phase detection system includes a first rotating member with a first encoded disk attached thereto, a second rotating member coupled to the first rotating member, and a second encoded disk attached thereto. A first inductive proximity sensor is provided near the periphery of the first disk and a second inductive proximity sensor is provided near the periphery of the second disk. A data processing system is provided for receiving the signals from the first and second sensors, which are sampled periodically to produce first and second detected signal sequences that can be used to determine the phase relationship between the rotating members.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A and 4B are plan views of the disk shown in FIG. 2, wherein FIG. 4B illustrates the peripheral encoding of a pseudo-random sequence;

DETAILED DESCRIPTION OF THE PREFERRED EMBODIMENT

A preferred embodiment of the present invention will now be described as an illustrative example of the present invention and with reference to the figures, wherein like numbers indicate like parts.

Figure 1:
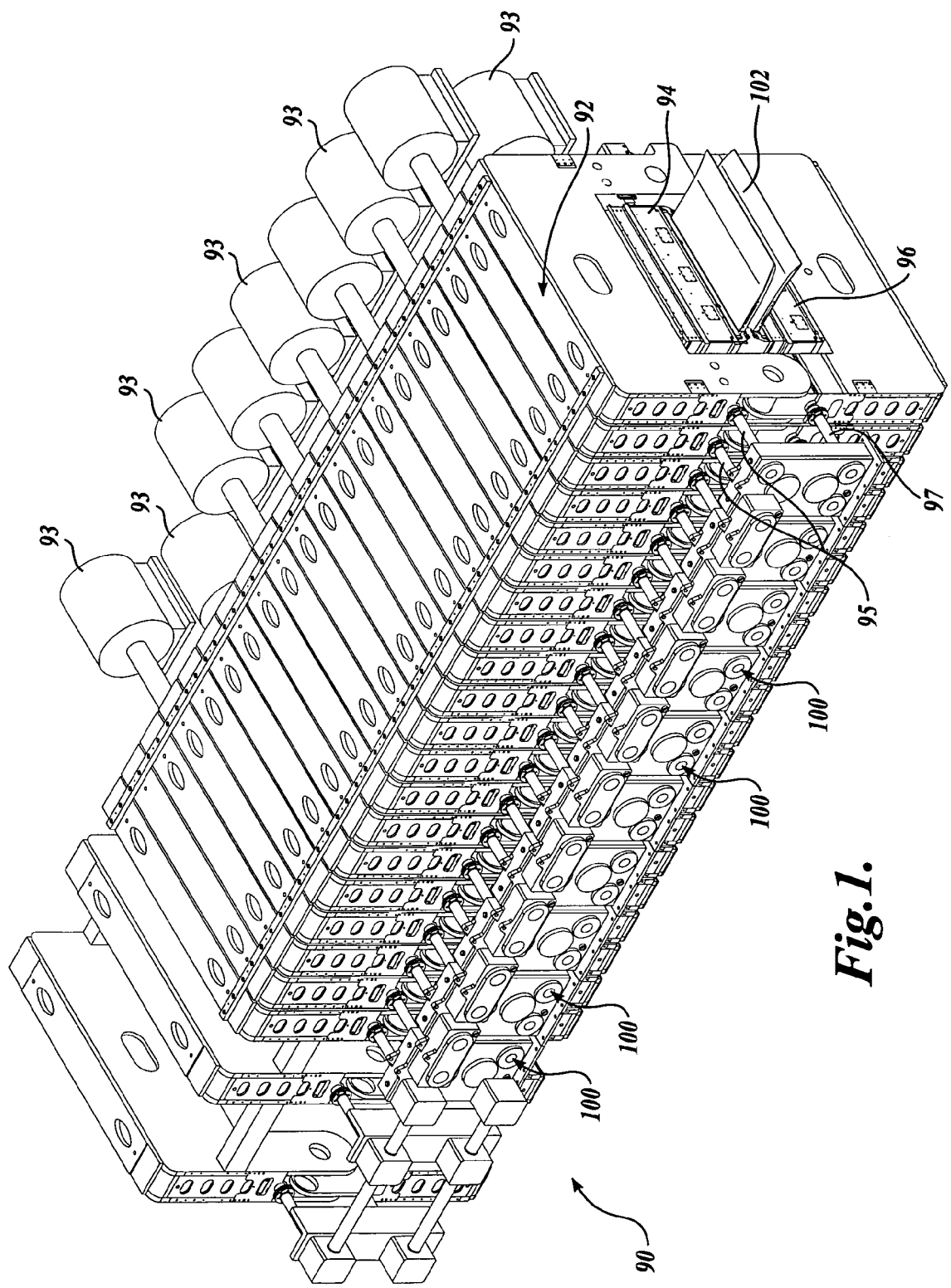
FIG. 1 is a perspective view of a press apparatus representing an exemplary application for the phase detection system of the present invention.

An exemplary application for the preferred embodiment of the present invention is to determine the rotational phase angle relationship between two rotating shafts cooperatively engaged in a machine, such as the press apparatus 90 shown in FIG. 1. This exemplary press 90 includes a number of individual press modules 92, each module having an upper press portion 94 and an oppositely-disposed, counter-acting, lower press portion 96. In this press 90, the individual press modules 92 are actuated by rotating crank shafts 95, 97 that are driven by a number of motors 93 that operate in a precisely coordinated manner such that the upper shafts 95 are all substantially rotationally in phase and the lower shafts 97 are all substantially in phase and counter-rotating with respect to the upper shafts 95. The coordinated press modules 92 compress and propel a strand board material through a central channel 102 of the press 90. At least some of the upper and lower shaft 95, 97 includes phase detector assemblies 100, as described below. Although this illustrative example shows shafts 95, 97 that are operated in phase, it will be appreciated that the present invention is not restricted to detecting the rotational phase between components intended to operate in-phase but can be extended in a very straightforward manner to determine the phase between components operating at different phase angles.

Figure 2:
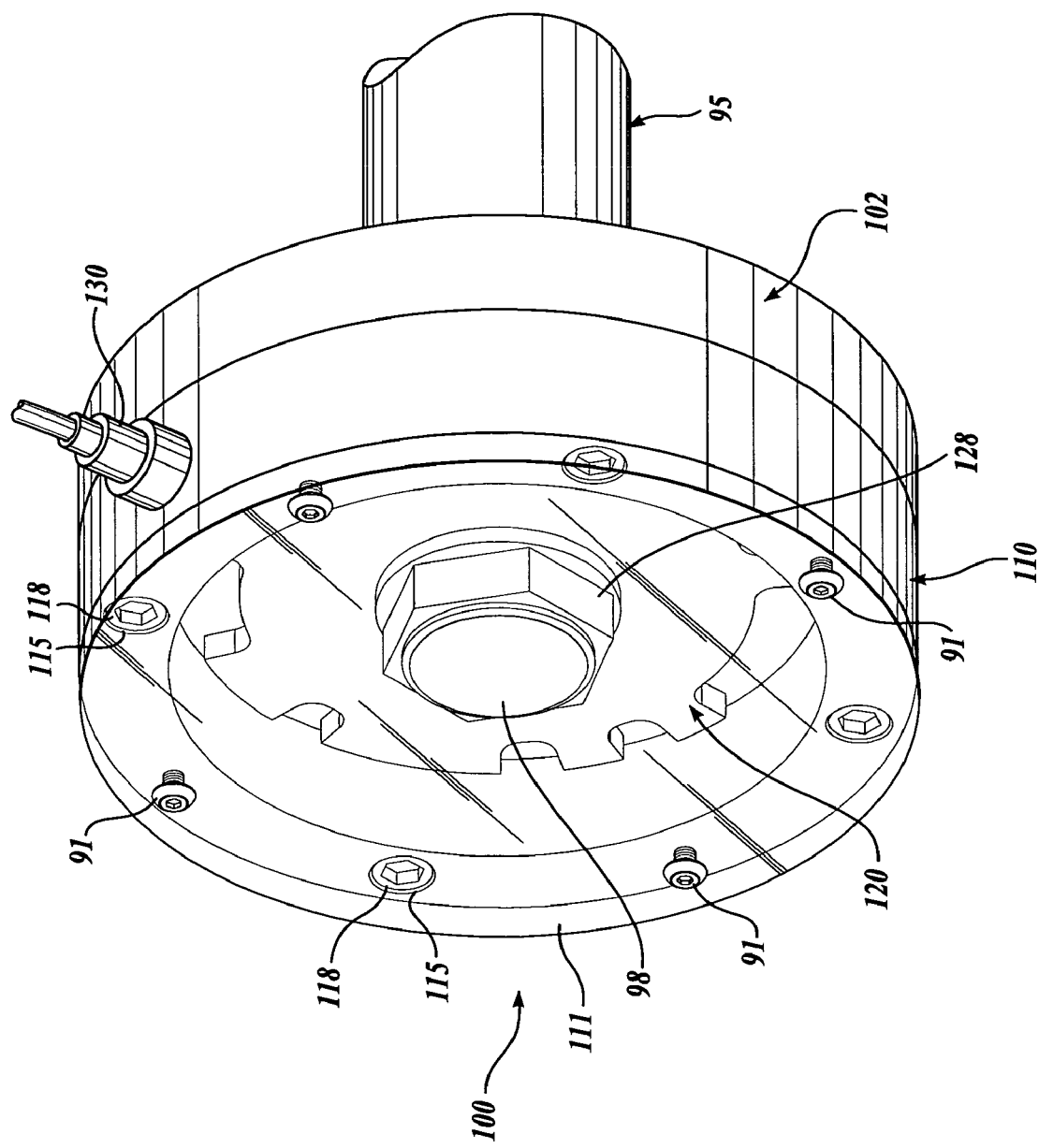
FIG. 2 is a perspective view of a phase detector assembly in accordance with the present invention.
Figure 3:
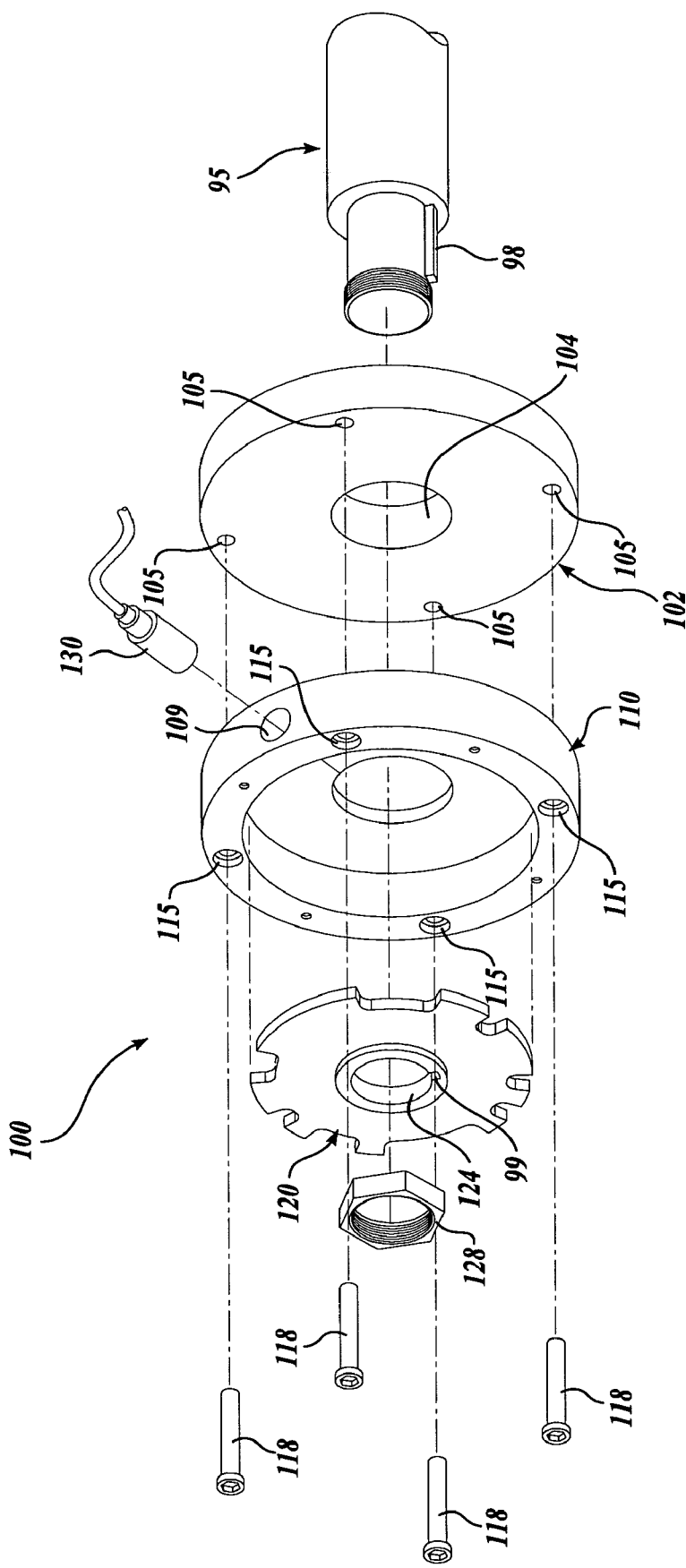
FIG. 3 is an exploded perspective view of the phase detector assembly shown in FIG. 2, with the transparent cover removed for clarity.

Refer now also to FIGS. 2 and 3, which show a phase detector assembly 100 that is mounted on the end of upper shaft 95. FIG. 2 shows a perspective view of the phase detector assembly 100 and FIG. 3 shows an exploded view of the phase detector assembly 100 mounted on the shaft 95. The phase detector assembly 100 includes a base plate 102 that may be mounted securely to a support structure—for example, the structure supporting the shaft 95. The support plate 102 includes a center aperture 104 that is sized to accommodate the keyed mounting post on the shaft 95. A cover member 110 is attached to the base plate 102 and includes a transparent cover plate 111 attached with mounting bolts 91 (not shown in FIG. 3 for clarity).

A disk 120 encoding a pseudo-random sequence about its periphery, as described below, includes a center aperture 124 that includes a slot 99 to engage the keyed mounting post 98 of the shaft 95 such that the encoded disk 120 rotates with the shaft 95. The encoded disk 120 may be secured, for example, with a mounting nut 128 that threadably engages the keyed mounting post 98. The cup-shaped cover member 110 encloses the disk 120 without interfering with disk rotation. The cover member 110 may be secured to the base plate 102, for example, with mounting bolts 118 that extend through apertures 115 in the cover member 110 and engage threaded apertures 105 in the base plate 102.

A sensor 130, such as a proximity sensor, is mounted in an aperture 109 extending radially through the cover member 110 such that the sensor 130 is located near the perimeter of the disk 120. In the current embodiment, the sensor 130 is an inductive proximity sensor. A suitable sensor, by way of example, is inductive proximity sensor model number NJ1.5-6.5-50-E-V3 available from Pepperl+Fuchs, Inc., of Twinsburg, Ohio. This particular sensor is flush-mountable and has a manufacturer's identified sensing range of 1.5 mm. It will be appreciated that any number of alternative sensors could be utilized and that the particular detector selected will depend on the particular application, which selection is believed to be well within the skill in the art.

Figure 4A:
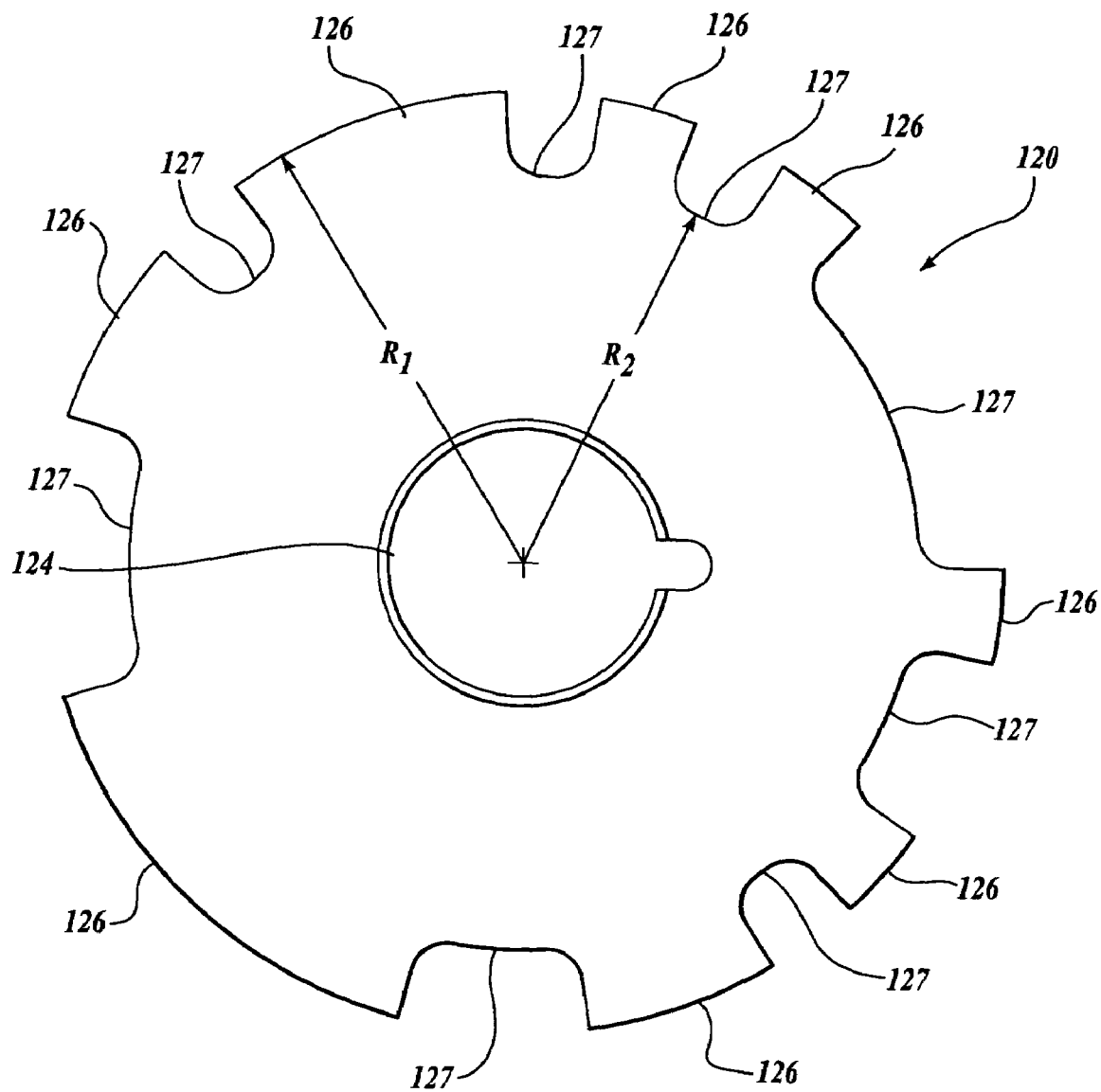

The operation of the sensor 130 will become apparent with reference to FIG. 4A, which shows a plan view of the encoded disk 120. The disk 120 includes a keyed center aperture 124 to rotationally lock the disk 120 to rotate with the shaft 95 (FIG. 3). The disk 120 of the disclosed embodiment is made from a ferrous material such as a mild steel and includes first sections 126 having a long radius R1 and second sections 127 having a short radius R2. The first sections 126 and second sections 127 are formed to encode a pseudo-random binary sequence—for example, an M-sequence in pseudo-random code, as discussed below.

Figure 4B:
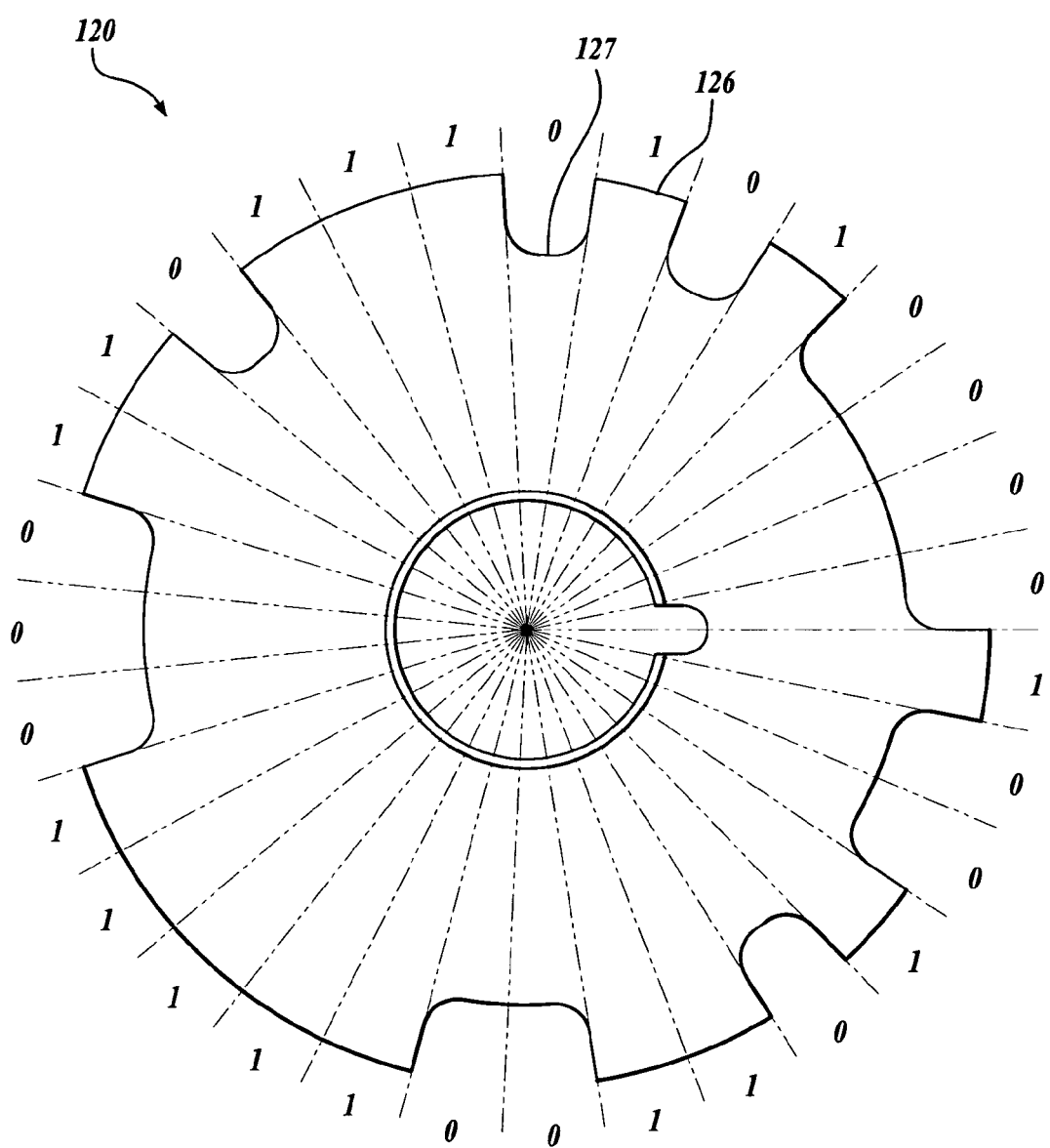

FIG. 4B shows a plan view of the encoded disk 120. Dashed guide lines divide the disk 120 circumferentially into thirty-one equal sections. It will be appreciated from FIG. 4B that, if each of the thirty-one sections of the disk 120 is assigned a value of "1" if the section is a first section 126 and "0" if it is a second section 127, a 31-digit pseudo-random M-sequence is recovered. In the present embodiment, beginning on the right side of the disk 120 as shown in FIG. 4B and proceeding counterclockwise, the binary sequence 0000 1010 1110 1100 0111 1100 1101 001 is generated. This binary sequence is a well-known 31-digit M-sequence in pseudo-random code.

Referring also again to FIGS. 2 and 3, it will be now be appreciated that, as the encoded disk 120 rotates, the proximity sensor 130 disposed near the first radius R1 of the disk 120 will generate a first signal (e.g., a "high" signal) when the longer first sections 126 of the disk 120 are adjacent the sensor 130 and will generate a second signal (e.g., a null signal) when the first sections 126 are not adjacent the sensor 130.

Figure 5:
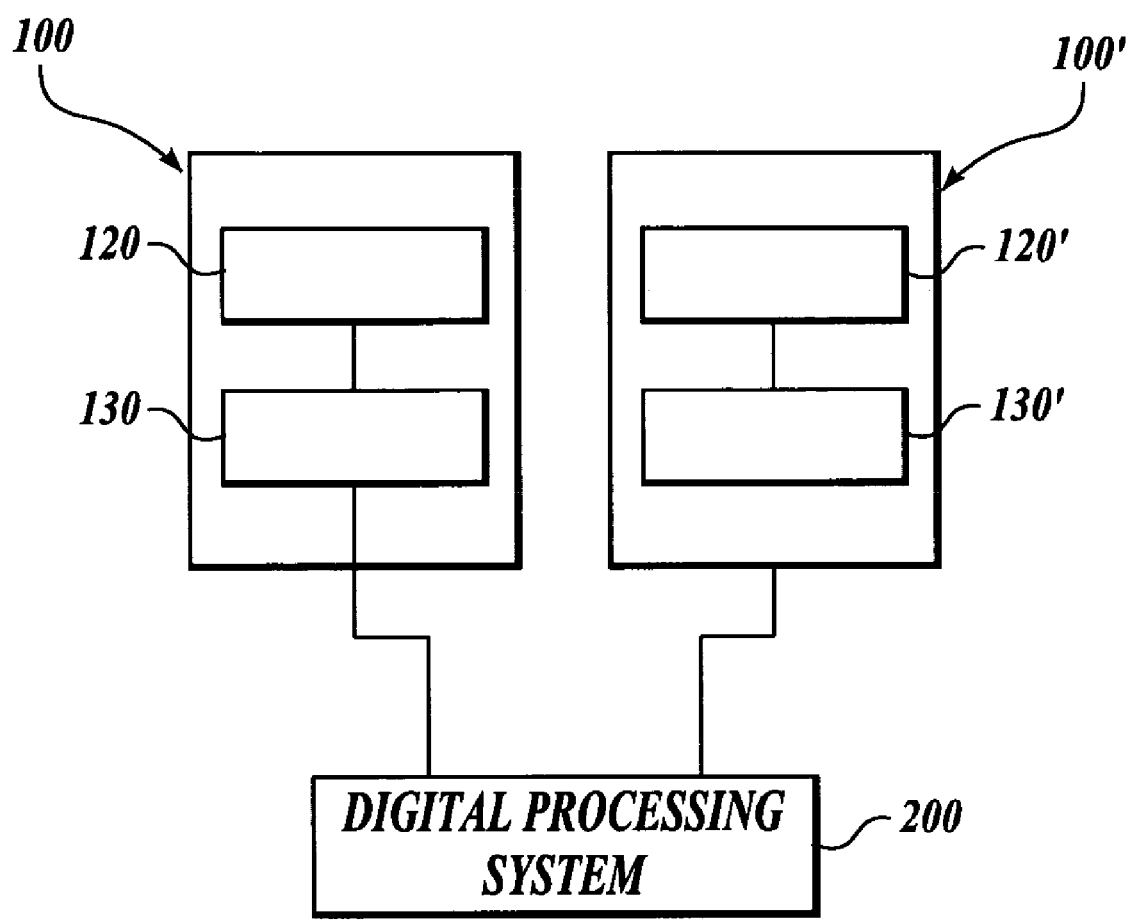
FIG. 5 is an exemplary system for processing the sequences detected by two phase detector assemblies as shown in FIG. 2.

FIG. 5 shows schematically two phase detector assemblies 100, 100' that are connected to a digital processing system 200 such as a conventional computer or the like. The phase detector assemblies 100, 100' each include sensors 130, 130' as discussed above that detect the pseudo-random sequence encoded on the respective disks 120, 120'. The detected signal is transmitted to the digital processing system 200. In an exemplary mode of operation, the sensor 130 is sampled at a rate of approximately 50 kHz. The detected voltage signal is recorded to generate a sequence approximately corresponding to the encoded pseudo-random sequence from the encoded disk 120.

Figure 6:
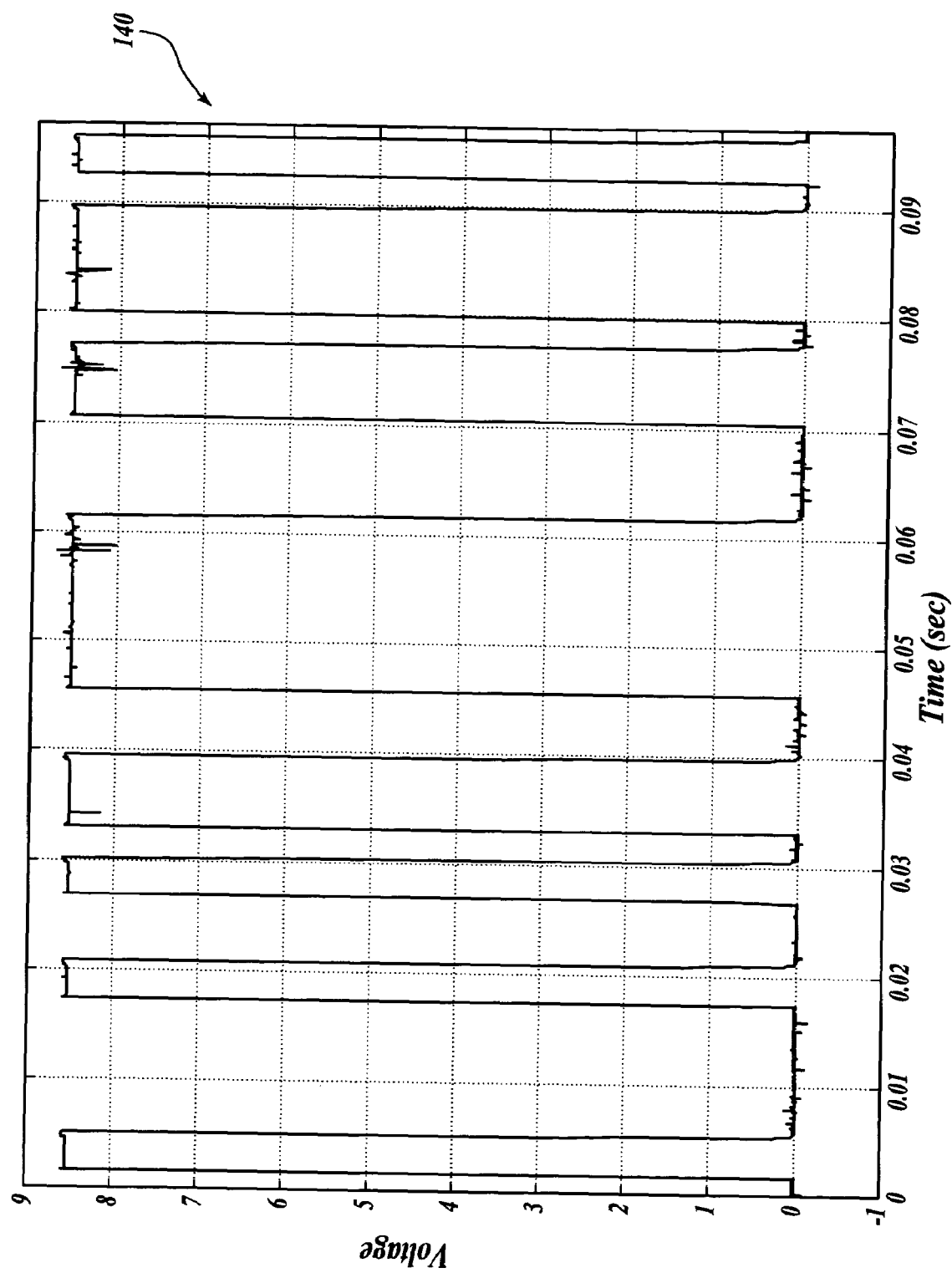
FIG. 6 is an exemplary graph of a detected sequence for approximately one revolution of the disk coded with a pseudo-random sequence shown in FIG. 4A.

FIG. 6 shows an exemplary graph of a detected signal sequence 140 for approximately one revolution of the disk 120. The sensor 130 returns a signal that for most of the sample period is either "on" (e.g., a relatively high-voltage signal) or "off" (e.g., a null signal). The detected signal sequence 140 will typically also include some noise, as shown in FIG. 6.

Figure 7:
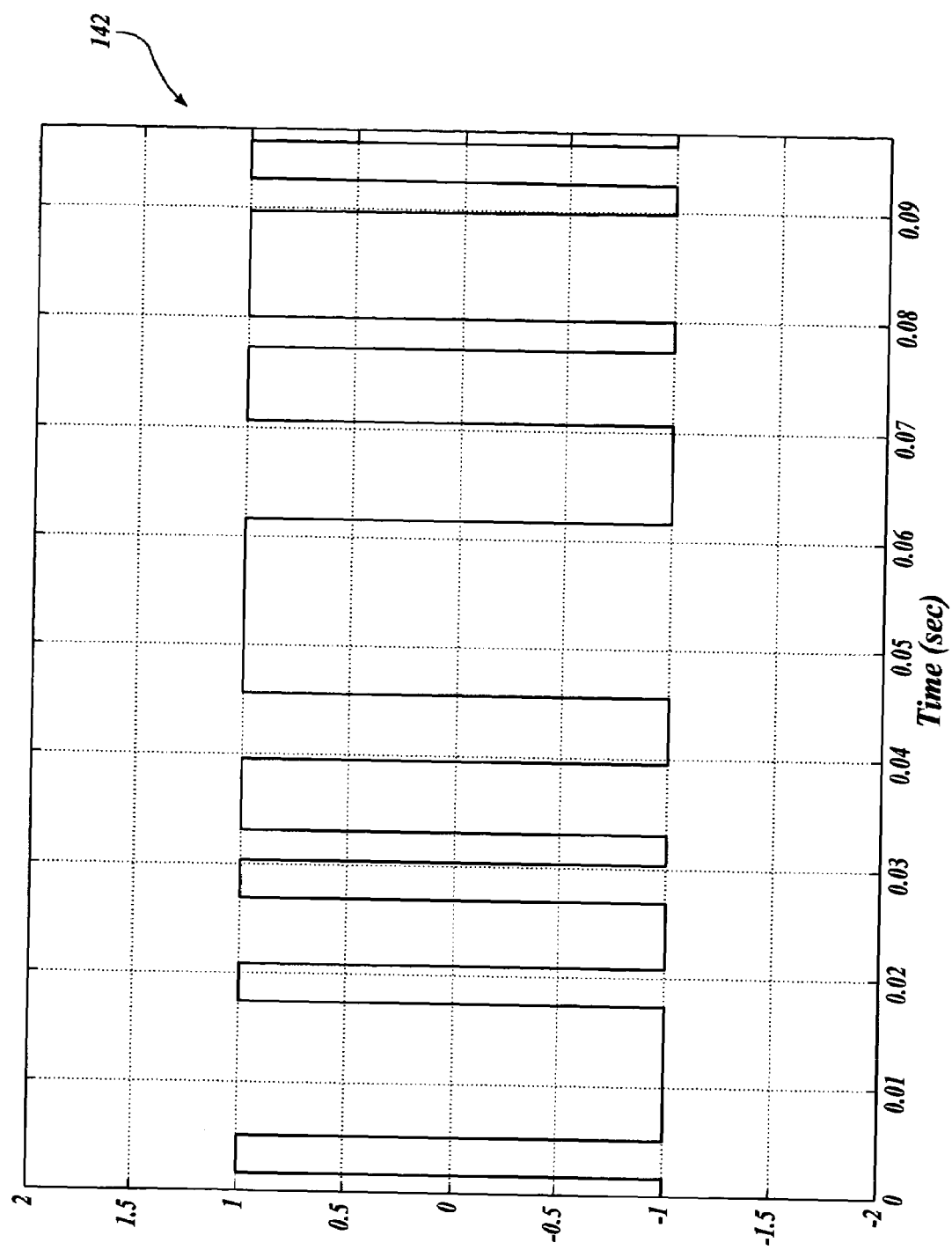
FIG. 7 is a normalized sequence obtained from the detected sequence shown in FIG. 6, processed to remove noise and normalized between +1 and −1.

FIG. 7 shows a normalized signal sequence 142 obtained from the detected signal sequence 140 shown in FIG. 6, wherein the signal 140 has been processed to remove the noise and normalized to range between +1 and −1. By cross-correlating the normalized signal sequences 142 from two co-rotating disks 120, each equipped with a phase detection assembly 100, the rotational phase relationship between the rotating members can be determined to a very high accuracy.

The detected signal sample rate is substantially greater than the random sequence passage rate (in the present case, 31 digits per revolution). In a current embodiment, the sensor 130 is sampled at a rate of approximately 50 kHz for a system having a rotation rate of approximately 1,000 rpm. Therefore, the detected signal sequence 140 shown in FIG. 6 is obtained from signals obtained from a sensor 130 at a rate of approximately 3,000 readings per revolution. The relatively large number of readings per revolution permits good resolution of the phase relationship between the rotating members.

Figure 8:
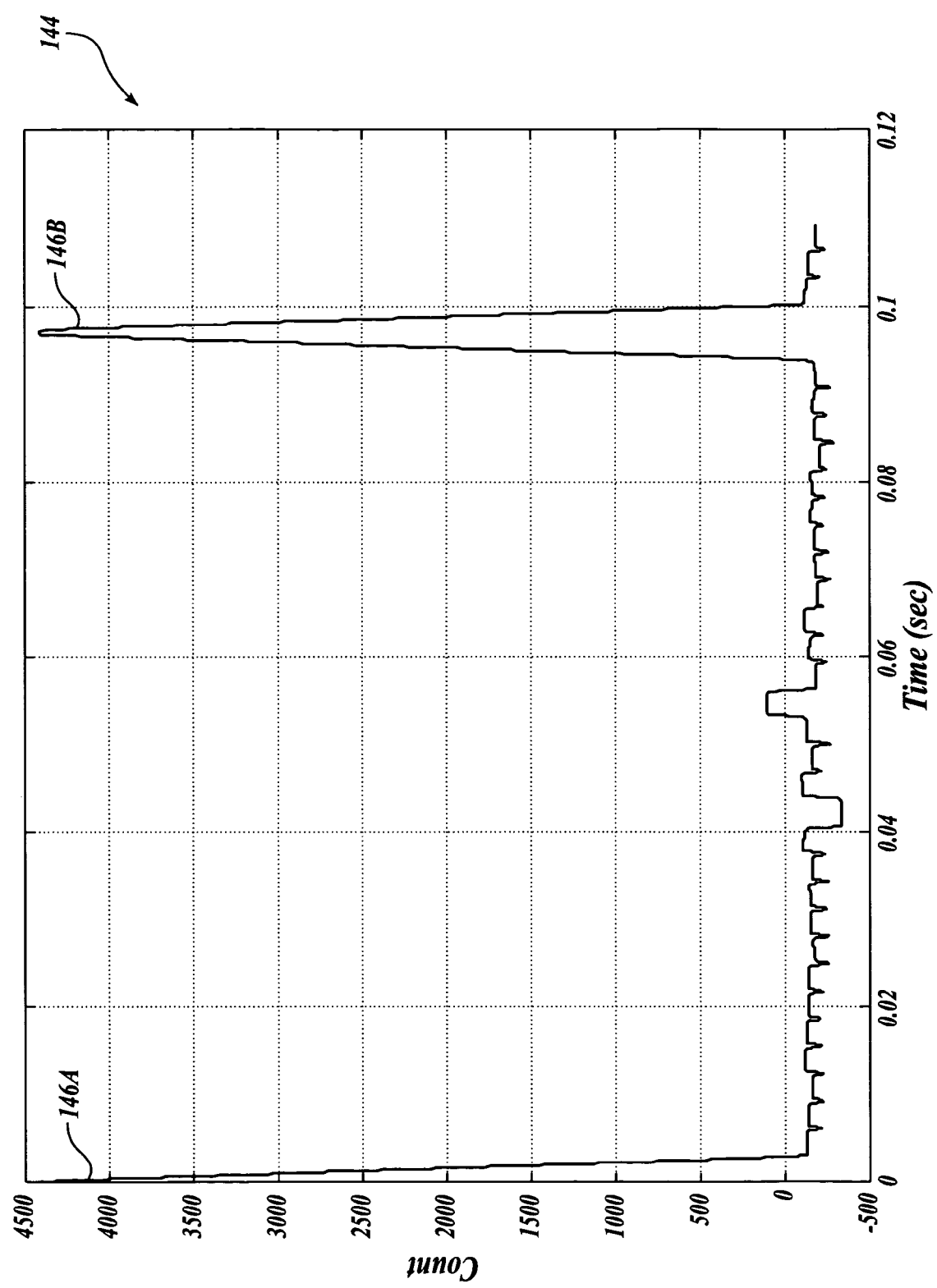
FIG. 8 shows an exemplary calculated cross-correlation function from two normalized sequences from related rotating disks, similar to the normalized sequence shown in FIG. 7.
Figure 10:
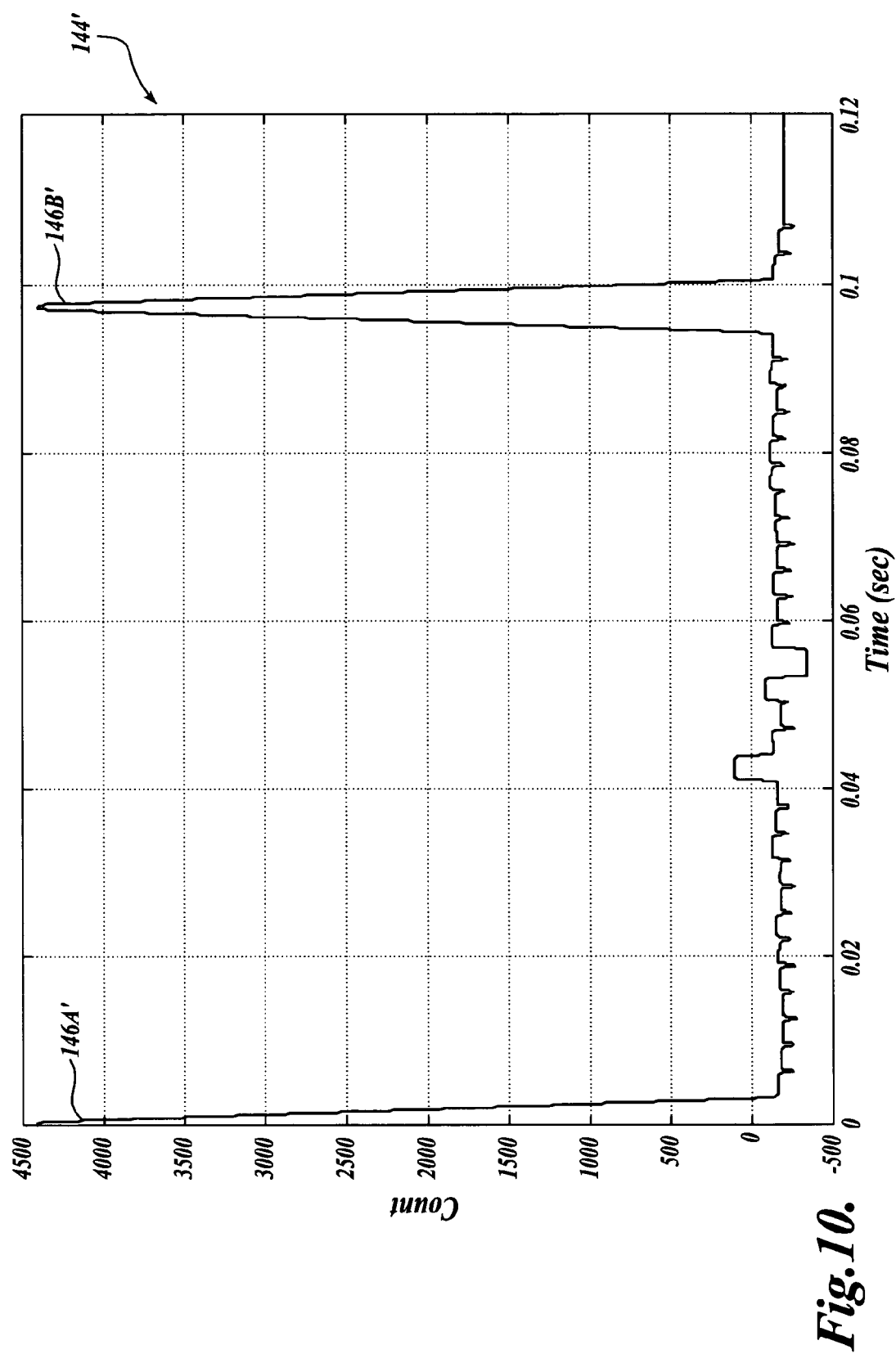
FIG. 10 shows a calculated cross-correlation function from the two normalized sequences from the related rotating disks.

FIG. 8 shows an exemplary calculated cross-correlation 144 of two normalized signal sequences 142, such as the normalized signal sequence 142 shown in FIG. 7. In FIG. 8 a second normalized signal sequence is cross-correlated with a first normalized signal sequence. FIG. 10 shows the calculated cross-correlation 144' of the first normalized signal sequence 142 with the second normalized signal sequence 142. The well-known cross-correlation functions are defined as:

$$CrF_{2\text{-}1}(\tau) = \int_0^T f_2(t-\tau) f_1(t) dt \quad (1)$$

$$CrF_{1\text{-}2}(\tau) = \int_0^T f_1(t-\tau) f_2(t) dt \quad (2)$$

where the subscript "1" refers to the first sequence and the subscript "2" refers to the second sequence. Equation (1) defines the cross correlation function of the second signal sequence $f_2$ with first signal sequence $f_1$ and equation (2) is the cross correlation function of the first signal sequence $f_1$ with the second signal sequence $f_2$. It will be appreciated that the normalized signal sequences $f_1$ and $f_2$, respectively, are obtained from the detected signals from two co-rotating disks 120 having the same encoded pseudo-random sequence. It should also be appreciated that, when the normalized signal sequences are cross-correlated, the highest correlation occurs only when the detected signals are aligned. This aligned condition is manifested in the calculated cross-correlation functions 144 shown in FIG. 8 by the abrupt spikes or peaks 146A, 146B in the graph.

Figure 9:
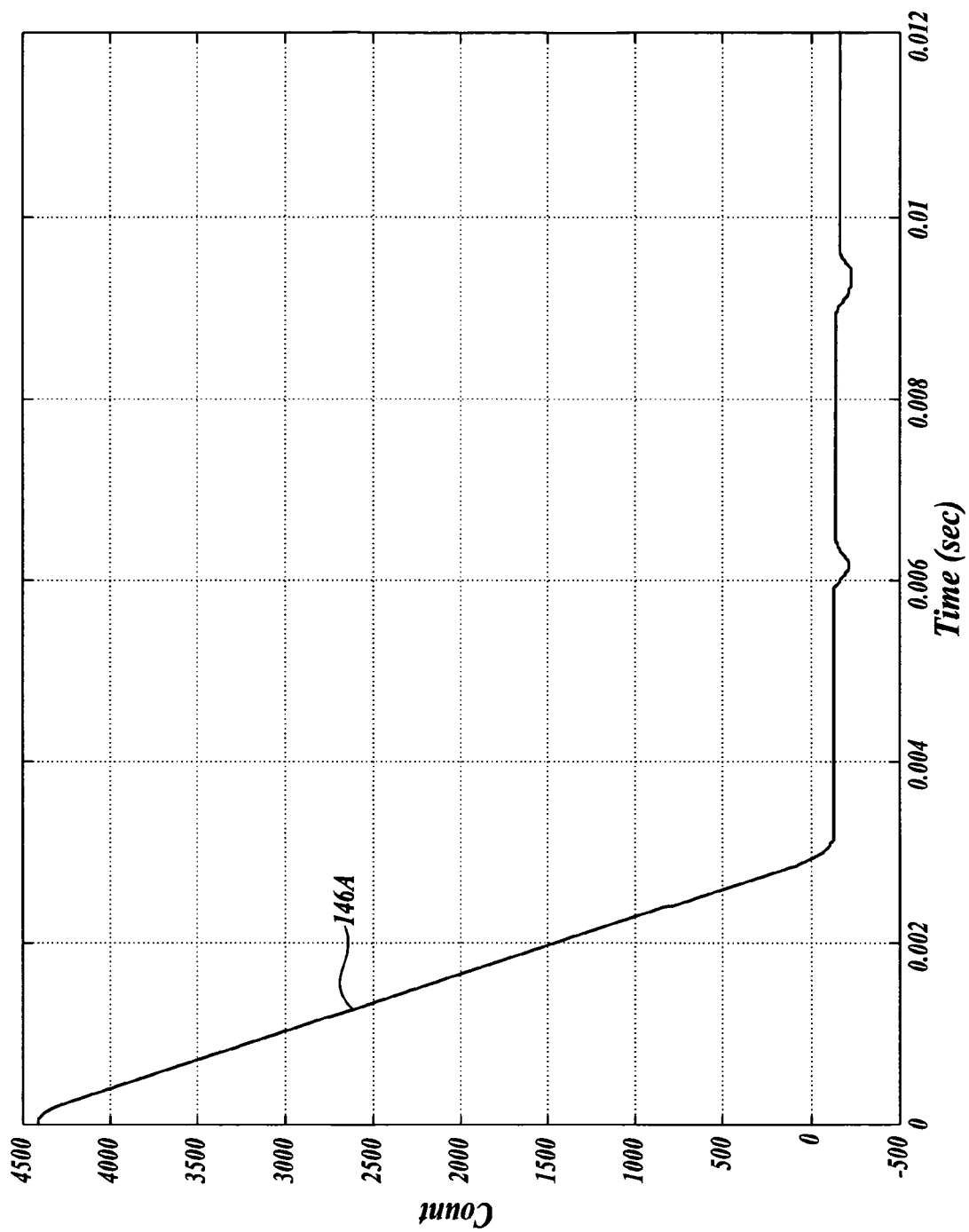
FIG. 9 is a close-up view of a portion of the calculated cross-correlation function shown in FIG. 8.
Figure 11:
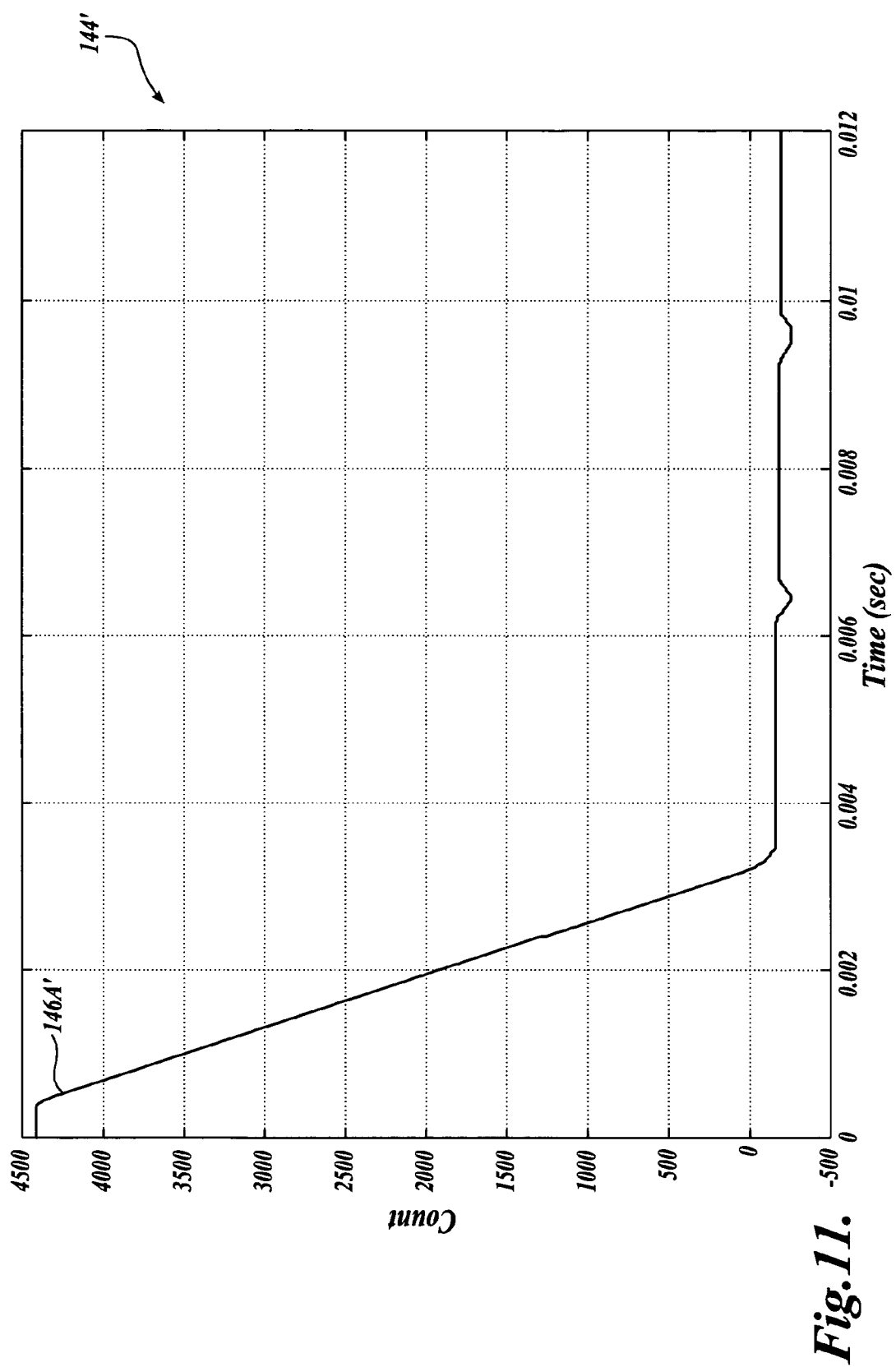
FIG. 11 is a close-up view of a portion of the calculated cross-correlation function shown in FIG. 10.

The cross correlation function 144 of signal 2 to signal 1, shown in FIG. 8, covers slightly more than one full revolution of the disks 120. The peaks 146A, 146B in the calculated cross-correlation 144 occur when the first and second signals are aligned, if one imagines time-shifting the second signal sequence $f_2$ with respect to the first signal $f_1$, the peaks 146A, 146B occur when the second signal sequence is shifted such that the first and second signals are aligned. Therefore, the horizontal location of the first peak 146A in the calculated cross-correlation of FIG. 8 indicates the phase (time) relationship between the first and second disks 120. In FIG. 8, the detected sequences are very close to being in-phase. FIG. 9 shows a close-up of the first peak 146A. FIG. 11 is a similar close-up of the first peak 146A' from FIG. 10.

In the present embodiment, the two disks 120 are initially substantially aligned in the same orientation relative to the corresponding sensors 130 such that the horizontal location of the first peak 146A in the calculated cross-correlation 144 shown in FIG. 8 indicates the time difference between the rotational phase of the co-rotating disks 120 (and therefore, the associated shafts). The angular phase difference can be calculated by dividing the time of the first peak 146 by the period of disk 120 rotation.

Referring again to FIGS. 9 and 11, the first peaks 146A, 146A' include a relatively narrow horizontal portion with a falling portion to the right. It will be appreciated that the disclosed system and method may be used as described heretofore to determine the phase relationship between the disks 120 if the accuracy within the narrow flat portion of the peak 146A is sufficient. Alternatively improved accuracy may be obtained, for example, by estimating the "midpoint" of the flat portion of the peaks 146A, 146B and using the midpoint to determine the time difference on the horizontal axis.

Figure 12:
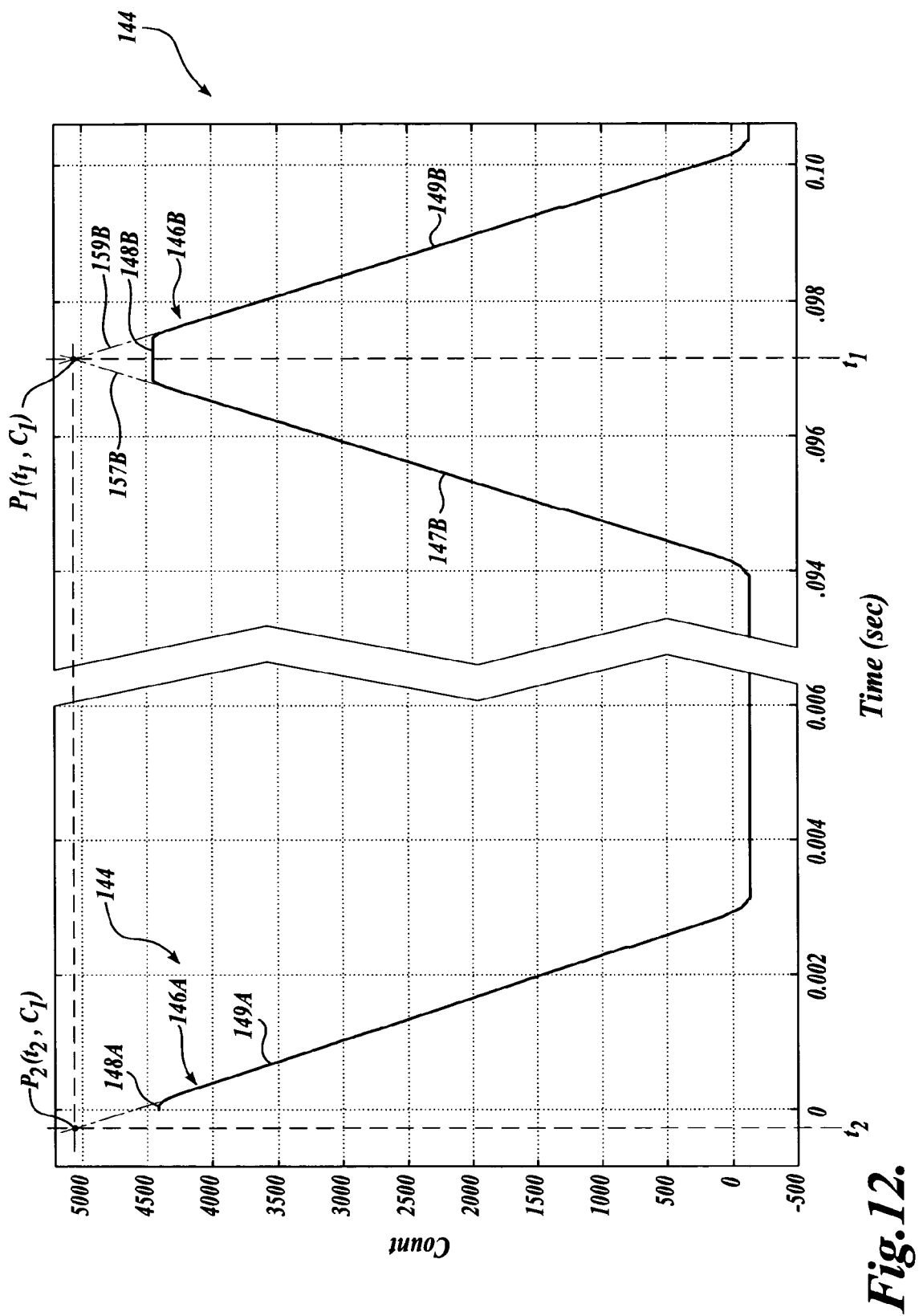

A more accurate method for determining the phase relationship will now be described with reference to FIG. 12, which shows a broken graph of the calculated cross-correlation 144 showing both peaks 146A and 146B. It will be appreciated that the calculated cross-correlation 144 is done for more than a full revolution of the disks 120. Refer now to the second peak 146B, which has a rising portion 147B, an intermediate portion 148B, and a falling portion 149B. The rising portion 147B and the falling portion 149B are substantially linear along a portion of their length near the intermediate portion 148B. Therefore, a straight-line, best-fit extrapolation of the falling portion 149B can be constructed, indicated as 159B, for example, using a conventional best fit algorithm; similarly, a straight-line extrapolation of the rising portion 147B can be constructed, indicated as 157B. These two lines 159B and 157B will cross above the intermediate portion 149B at a point $P_1(t_1, C_1)$, wherein $t_1$ is the time coordinate from the horizontal axis and $C_1$ is the cross-correlation coordinate from the vertical axis. Now, refer to the first peak 146A, which also includes a falling portion 149A and an intermediate portion 148A. A similar best fit, straight-line extrapolation of the falling portion 149A may be constructed that intersects the horizontal line corresponding to $C_1$ at point $P_2(t_2, C_1)$ in FIG. 12, where $t_2$ is the time coordinate from the horizontal axis for $P_2$.

Now it will be appreciated that the period of rotation T for the rotating disks 120 can be calculated as $t_1-t_2$. Also, $t_2$ represents the time difference between the rotating disks 120. Therefore, the phase difference between the first and second disks 120 (and associated shafts) can be calculated as $Ph = t_2/T$.

It will be appreciated that the above-described algorithm for calculating the phase difference is the currently preferred algorithm and is intended to aid the artisan in understanding the present invention. It is contemplated, however, that other methods for calculating the precise phase difference could be used without departing from the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A phase detection system comprising:
   a first rotating member;
   a second rotating member that is rotationally coupled to the first rotating member such that the first and second rotating members rotate at substantially the same rate;
   a first disk attached to the first rotating member such that the first disk rotates with the first rotating member, the first disk having a binary pseudo-random sequence encoded sequentially about a periphery of the first disk;
   a second disk attached to the second rotating member such that the second disk rotates with the second rotating member, the second disk having the binary pseudo-random sequence encoded sequentially about a periphery of the second disk;
   a first sensor disposed at a first location near the periphery of the first disk, the first sensor operable to periodically detect the binary pseudo-random sequence at the first location as the first disk rotates and generating a first detected sequence from the detected binary pseudo-random sequence;
   a second sensor disposed at a second location near the periphery of the second disk, the second sensor operable to periodically detect the binary pseudo-random sequence at the second location as the second disk rotates and generating a second detected sequence from the detected binary pseudo-random sequence; and
   a data processing system that receives the first and second detected sequences and cross-correlates the first detected sequence with the second detected sequence to determine the rotational phase relationship between the first rotating member and the second rotating member.

2. The system of claim 1, wherein the binary pseudo-random sequence is an M-sequence.

3. The system of claim 2, wherein the binary pseudo-random sequence is encoded onto the first and second disks by contouring the perimeter of the first and second disks to correspond to the binary pseudo-random sequence.

4. The system of claim 2, wherein the first and second disks each comprise circumferential sections, each section corresponding to a digit in the pseudo-random sequence, and wherein the binary pseudo-random sequence is encoded onto the first and second disks such that sections corresponding to zeros of the pseudo-random sequence have a first radius and sections corresponding to ones of the pseudo-random sequence having a second radius different from the first radius.

5. The system of claim 2, wherein the binary pseudo-random sequence has 31 digits.

6. The system of claim 4, wherein the first and second sensors are inductive proximity sensors.

7. The system of claim 6, wherein the first and second disks are formed of a ferrous material.

8. The system of claim 6, wherein the first detected sequence is generated by reading the first sensor at about 50 kHz.

9. The system of claim 4, wherein the data processing system normalizes the first detected sequence and the second detected sequence to range between +1 and −1 prior to cross-correlating the first detected sequence with the second detected sequence.

10. The system of claim 9, wherein the data processing system removes noise from the first detected sequence and the second detected sequence prior to cross-correlating the first detected sequence with the second detected sequence.

11. A method for determining the rotational phase relationship between two rotationally coupled members, the method comprising the steps of:
   attaching a first disk to a first rotating member, the first disk having a perimeter portion encoding a binary pseudo-random sequence;
   attaching a second disk to a second rotating member that is rotationally coupled to the first rotating member, the second disk having a perimeter portion encoding the binary pseudo-random sequence;
   providing a first sensor at a first location near the perimeter of the first disk, periodically detecting the value of the encoded binary sequence from the first disk at the first location and recording the periodically detected values to define a first sequence;
   providing a second sensor at a second location near the perimeter of the second disk, periodically detecting the value of the encoded binary sequence from the second disk at the second location and recording the periodically detected values to define a second sequence; and
   cross-correlating the first sequence with the second sequence to determine the rotational phase relationship between the first rotating member and the second rotating member.

12. The method of claim 11, wherein the binary pseudo-random sequence is an M-sequence.

13. The method of claim 12, wherein the binary pseudo-random sequence is encoded onto the first and second disks by contouring the perimeter of the first and second disks to correspond to the binary pseudo-random sequence.

14. The method of claim 12, wherein the first and second disks each comprise circumferential sections, each section corresponding to a digit in the pseudo-random sequence, and wherein the binary pseudo-random sequence is encoded onto the first and second disks such that sections corresponding to zeros of the pseudo-random sequence have a first radius and sections corresponding to ones of the pseudo-random sequence having a second radius different from the first radius.

15. The method of claim 12, wherein the binary pseudo-random sequence has 31 digits.

16. The method of claim 14, wherein the first and second sensors are inductive proximity sensors.

17. The method of claim 16, wherein the first and second disks are formed of a ferrous material.

18. The method of claim 16, wherein the first detected sequence is generated by reading the first sensor at about 50 kHz.

19. The method of claim 14, further comprising the step of normalizing the first detected sequence and the second detected sequence to range between +1 and −1 prior to cross-correlating the first detected sequence with the second detected sequence.

20. The method of claim 14, further comprising the step of removing noise from the first detected sequence and the second detected sequence prior to cross-correlating the first detected sequence with the second detected sequence.

21. The method of claim 19, wherein the cross-correlation of the first detected sequence with the second detected sequence is conducted for a time period greater than a full period of revolution to define at least a first peak and a second peak, and further comprising the steps of:
- linearly extrapolating a rising portion and a falling portion of the second peak to find a point of intersection defining a first time and a first cross-correlation value;
- linearly extrapolating a falling portion of the first peak to find a point a second time corresponding to a second time when the linear extrapolation reaches the first cross-correlation value;
- subtracting the second time from the first time to determine the period of rotation; and
- dividing the second time by the period of rotation to calculate the rotational phase relationship between the first and second rotating members.

* * * * *